Jan. 16, 1945.  C. R. STONE  2,367,651
VALVE INDICATOR
Filed Dec. 21 1942  2 Sheets-Sheet 1

Inventor:
Carl R. Stone:
By Joseph O. Lange Atty.

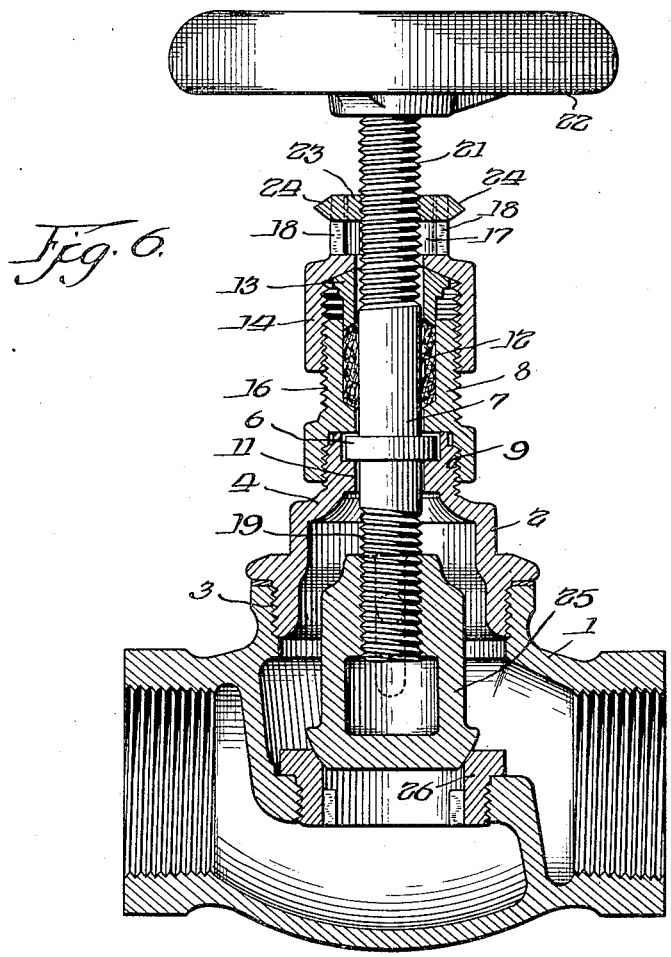

Patented Jan. 16, 1945

2,367,651

UNITED STATES PATENT OFFICE 2,367,651

VALVE INDICATOR

Carl R. Stone, Chicago, Ill., assignor to Crane Co., Chicago, Ill., a corporation of Illinois Application December 21, 1942, Serial No. 469,759

8 Claims. (Cl. 116—125)

This invention relates to valves generally and more particularly to a new and improved valve indicating means and has for one of its principal objects the provision of indicating the exact position of the valve closure member in non-rising stem types of valves.

At the outset, it should be appreciated that when non-rising stem valves are positioned in a pipe line there are no outwardly visible means for ascertaining whether the valve closure member is in an open or closed position because the stem is axially stationary at all times in this type of valve. In order to meet this condition, relatively expensive and complex indicators have been provided for use on non-rising stem valves, but in general, these structures have possessed numerous faults and weaknesses, as for example, projecting out from the body of the valve proper and therefore interfering with the adjustment of the packing nut and the servicing of the stuffing box. More frequently, a long indicator needle has been employed in which the susceptibility of being bent, broken or twisted out of shape upon transporting or installing the valve has been ever present and therefore objectionable.

Accordingly, an important object of the present invention is to provide an improved valve indicating means for non-rising stem valves which substantially reduces manufacturing costs over previously made indicators, is more compact in its construction and is mounted in closely confined relation with the valve rather than projecting therefrom.

Another and further important object of this invention is to provide a valve indicator for a non-rising stem valve which is an integral part of the valve rather than an attachment added thereto.

Other and further important objects and advantages of this invention will become apparent from the disclosures in connection with the following specification and the accompanying drawings, in which Fig. 1 is a fragmentary sectional assembly view of a non-rising stem valve embodying my invention.

Fig. 6 is a sectional assembly view of a complete valve incorporating the invention.

Similar reference characters refer to similar parts throughout the several views.

Figure 1:
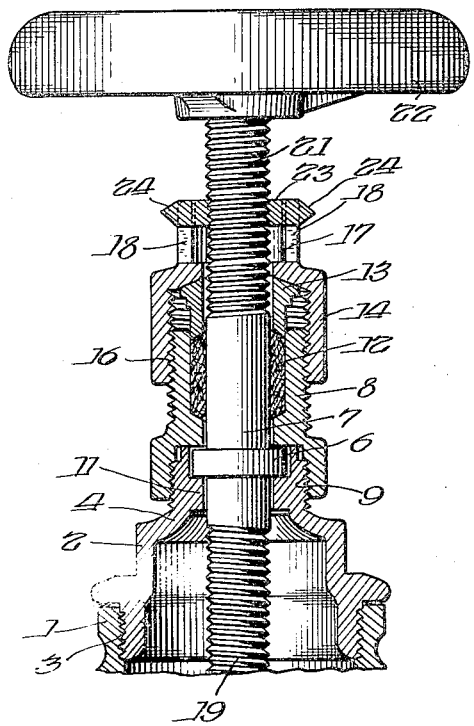

The reference numeral 1 indicates generally a valve body or the like and to which is attached the usual bonnet or centerpiece member 2, either threadedly attached as shown at 3 or otherwise bolted thereto. The inner central portion of the bonnet 2 is provided with an inwardly projecting annular flange portion 4 upon which the annular enlargement or collar 6 of the valve stem 7 is journally supported. A stuffing box member 8 threadedly engages the upper portion of the bonnet 2 as at 9. The inwardly extending annular flange portion 11 of the stuffing box 8, is positioned with relation to the collar 6 of the stem 7 so that the latter member is held journally rotatable but is not reciprocably movable. The packing 12 is compressed within the stuffing box 8 by means of the gland 13 and the packing nut 14, the gland being forced down upon the packing 12 by means of the threads 16.

Figure 2:
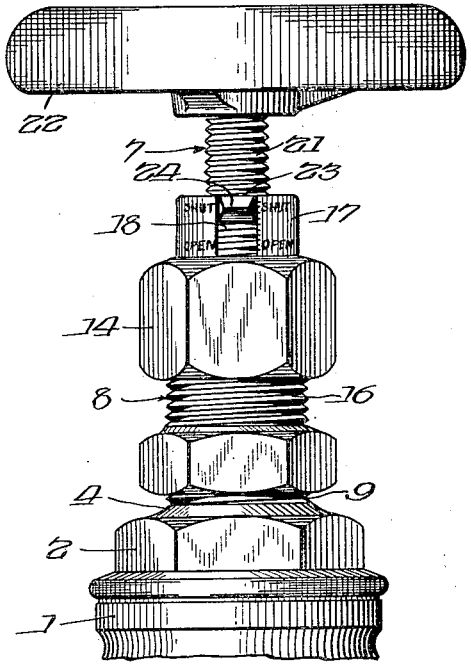
Fig. 2 shows an exterior view of the valve referred to in Fig. 1.
Figure 3:
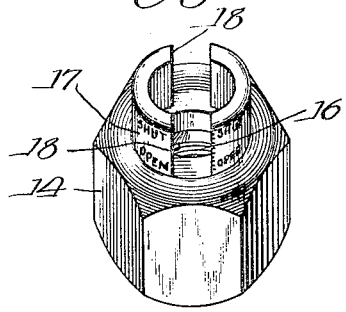
Fig. 3 is an exterior perspective view of a valve packing nut incorporating the indicator of this invention.

As more clearly shown in Figs. 2 and 3, the novel packing nut 14 is provided with an upper cylindrical extension 17 having the vertically extending slots 18 with the upper open end portions, as indicated. Adjacent to and preferably on both sides of the slots 18 suitably calibrated markings such as the words "Open" and "Shut" are provided to indicate whether the valve is actually opened or closed or throttled at some intermediate position therebetween.

The valve stem 7 is threaded at both ends, namely 19 and 21, and is provided with the usual handwheel 22 at its upper end which is rigidly and non-rotatably affixed thereto. A valve closure member 25 (Fig. 6) and which may be of any suitable form depending upon the type of casing employed, is internally threaded and engages the threads 19 at the lower end of the stem 7 so that upon predetermined rotation of the stem such valve closure member may be raised or lowered to its seat 26 to open and close the valve respectively. Obviously the seat 26 may be made integral with the valve casing, if desired.

Figure 4:
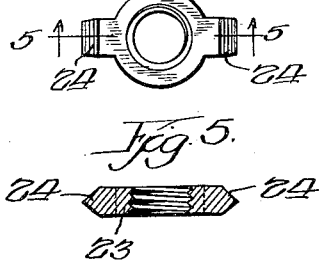
Fig. 4 is a top plan view of the novel indicator pointer.
Figure 5:
Fig. 5 is a sectional view taken on the line 5—5 of Fig. 4.

Figs. 4 and 5 show detailed views of the novel indicator used which consists of a ring-shaped body portion 23 which is internally threaded and has the oppositely disposed pointers extending from its outer periphery. As shown in Figs. 1 and 2, the indicator is mounted within the upper end limits of the cylindrical extension 17 with its pointers 24 projecting outwardly through the slots 18. In assembling the indicator member with the valve, the member 23 is placed within the cylindrical extension 17 of the packing nut 14 preferably before the packing nut has been assembled on the threads 16 of the stuffing box member 8. At such time the valve may be either fully opened or fully closed. The indicator pointers 24 are maintained with relation to the packing nut at a level in line with the words "Shut" or "Open" as applied to the cylindrical extension 17. Such latter positioning depends upon whether the valve is opened or closed at the time of such assembly. Thus the threads of the packing nut 14 engage the threads 16 of the stuffing box 8 when the indicator pointers 24 are at the proper level within the slots 18 as previously referred to. It is the gist of this invention and therefore significant to note that rotating the packing nut 14 to compress the packing within the stuffing box 8 does not affect the relative position of the indicator, since a fixed relationship has been established between the indicator scale on the extension 17 and the indicator pointers 24 regardless of the rotative movement of the packing nut. The fixed relaitonship referred to is obtained by the novel arrangement of having the lead of the packing nut threads 16 identical to that of the threads 21 of the stem and upon which the indicator member 23 is threadedly mounted. By such provision as above mentioned, the subsequent tightening of the packing nut 14 will cause the indicator to move simultaneously with the packing nut and therefore the calibration of the indicator, with relation to its scale on the cylindrical portion 17 of the packing nut will remain constant. Therefore, in operating the valve by rotation of the stem 7 by means of the handwheel 22, the closure member 25 may be raised or lowered from its seat, and the indicator pointers 24 will move longitudinally within the slots 18 of the packing nut 14 to thereby indicate accurately the relative position of the closure member wtihin the valve casing.

Thus it is evident that a simple, compact indicator for non-rising stem valves has been provided which is accurate and economical to manufacture. The arrangement and the number of slots and pointers on the indicator may be changed as desired, depending upon the number of locations at which the indication of valve position is desired. That is, one or more pointers may be used to project through a similar number of slots 18 in the upwardly extending cylindrical extension 17 and thus permit visual indication as to the position of the valve, regardless of which side of the valve may be exposed to view.

It is apparent that the details of construction may be varied throughout a wide range. Obviously, the invention need not be specifically applied to a valve, but may be used for other indicating functions. It is desired therefore not to limit the appended claims otherwise than as necessitated by the prior art.

I claim:

1. In a mechanism having a rotatable, longitudinally stationary, threaded shaft, the combination including a threaded stuffing box member, a packing nut having threads adapted to engage the threads on the said stuffing box member, packing within the said stuffing box member, the said packing nut having a slotted extension, a threaded indicator mounted on the said shaft and axially movable within the said slotted extension upon rotation of the said shaft, the shaft threads upon which said indicator is mounted having the same lead as the said packing nut threads, whereby rotational axial movement of the said packing nut upon its threads in compressing the packing within the said stuffing box member does not affect the longitudinal position of the said indicator with relation to the said packing nut.

2. In an indicator mechanism, the combination comprising a rotatable threaded shaft, a threaded stuffing box, a packing nut having threads to engage the threads of the said stuffing box and having a slotted extension, the said shaft being threaded at a location including a portion over which the slotted extension passes, an indicator threadedly mounted on the said shaft in non-rotatable relation to the said packing nut extension, whereby upon rotation of the said shaft the said indicator is axially movable relative to the said shaft and substantially within the longitudinal limits defined by the slotted extension, the threads on the said shaft and the said stuffing box having the same lead.

3. Indicator means of the character described, the combination including a threaded, axially immovable rotatable shaft, a threaded stuffing box member, a packing nut having threads adapted to engage the threads on the said stuffing box member, the packing nut having a cylindrical radially slotted extension, a threaded ring-like indicator member for engaging the threads of the said shaft and having substantially transversely extending indicating projections extending through the slots of the said extension whereby predetermined rotation of the said shaft effects reciprocable movement of the said indicator member relative to the said extension, the threads on the said shaft and the said stuffing box member having the same lead.

4. An indicator for valves or the like, the combination comprising a non-rising stem, a threaded stuffing box, a threaded packing nut engaging the threads on the said stuffing box and having a longitudinally slotted extension integral with the said packing nut, the slotted portion being substantially parallel to the longitudinal axis of the said stem, the said stem being threaded at an upper end portion, a non-rotatable indicator threadedly carried by the said stem on the upper end threaded portion thereof and having a pointer transversely positioned within the said slotted portion whereby reciprocable movement of the said indicator is obtained with relation to the said extension upon rotation of the said stem, the threads on the upper end portion of the said stem and the threads on the said stuffing box having the same lead.

5. An indicator for a valve comprising a body having a seat therein, a closure member therefor, a bonnet, an axially stationary stem, a threaded stuffing box member, a threaded packing nut adapted to engage the stuffing box threads, the said packing nut having an extension with a plurality of vertical slots open at their upper end, the said stem being threaded at its end portions, a valve closure member adapted to engage the threads on one end of the said stem and ride reciprocably thereon causing the closure member to be seated and unseated upon rotation of the stem, an axially movable indicator engaging the threads at the other end of the said stem and engaging the side walls of the slots of the packing nut extension, whereby reciprocable movement of the said indicator with relation to the said packing nut extension is effected upon rotation of the said stem, the said indicator upon adjustment of the said packing nut being axially and rotatably movable simultaneously with the said latter member.

6. An indicator for a valve comprising a body having a seat therein, a closure member therefor, a bonnet, an axially stationary stem, a threaded stuffing box member, packing within the stuffing box member a threaded packing nut adapted to engage the stuffing box threads, the said packing nut having an extension with a plurality of vertical slots open at their upper end, the said stem being threaded at its end portions, a valve closure member adapted to engage the threads on one end of the said stem and ride reciprocably thereon causing the closure member to be seated and unseated upon rotation of the stem, an axially movable indicator engaging the threads at the other end of the said stem and engaging the slots of the packing nut extension, whereby reciprocable movement of the said indicator with relation to the said packing nut extension is effected upon rotation of the said stem, the lead of the threads on one end of the said stem and of the threads on the said stuffing box being the same whereby a tightening of the packing nut to compress the packing within the said stuffing box does not change the spaced-apart relationship between the said indicator and the said packing nut.

7. In an indicator of the character described, the combination including an axially immovable shaft threaded at both ends, a threaded member journaled on one end of the said shaft and movable axially upon rotation of said axially immovable shaft, means providing a bearing for the said shaft, threaded sealing means adjustably positioned relative to the said latter means, threaded indicator means non-rotatably mounted relative to the said sealing means and axially movable on the said shaft upon rotation of the latter member, the threads of the said sealing means and the said indicator means having the same pitch whereby adjustably positioning said sealing means does not change the original position relative to the said indicator means, the said sealing means having an extended chamber portion for containing the said indicator means except for that visible portion of the indicating means functioning to show the axial positioning of the said shaft.

8. The combination of a stuffing nut for a valve or the like having a threaded actuating stem longitudinally immovable, the said stuffing nut being threadedly mounted to effect reciprocable movement thereof, indicator means threadedly mounted on the said stem and movable axially relative thereto, the said stuffing nut having a bifurcated extension for engagement by the said indicator means to inhibit its rotation upon rotation of the said actuating stem.

CARL R. STONE.